(12) United States Patent
Verstraeten et al.

(10) Patent No.: US 9,726,399 B2
(45) Date of Patent: Aug. 8, 2017

(54) SELECTIVE CATALYTIC REDUCTION TANK WITH HEATING ELEMENT

(75) Inventors: Steve Verstraeten, Antwerp (BE); Filip Lanckmans, Lennik (BE); Inge Schildermans, Marke (BE); Veerle Van Wassenhove, Aarsele (BE); Lieven Tack, Roeselare (BE)

(73) Assignee: NV BEKAERT SA, Zwevegem (BE)

( * ) Notice: Subject to any disclaimer, the term of this patent is extended or adjusted under 35 U.S.C. 154(b) by 584 days.

(21) Appl. No.: 14/131,006

(22) PCT Filed: Jul. 3, 2012

(86) PCT No.: PCT/EP2012/062917
§ 371 (c)(1),
(2), (4) Date: Jan. 6, 2014

(87) PCT Pub. No.: WO2013/004692
PCT Pub. Date: Jan. 10, 2013

(65) Prior Publication Data
US 2014/0138368 A1   May 22, 2014

(30) Foreign Application Priority Data

Jul. 7, 2011 (BE) .................................. 2011/0425
Jul. 7, 2011 (BE) .................................. 2011/0426

(51) Int. Cl.
*H05B 3/82* (2006.01)
*F24H 9/18* (2006.01)
(Continued)

(52) U.S. Cl.
CPC ............... *F24H 9/18* (2013.01); *B01D 53/00* (2013.01); *F01N 3/2066* (2013.01); *F23J 15/04* (2013.01);
(Continued)

(58) Field of Classification Search
CPC .......... F24H 9/18; F24H 1/202; F24H 9/1818; F24H 2250/02; B01D 53/00; F23J 15/00;
(Continued)

(56) References Cited

U.S. PATENT DOCUMENTS 3,319,047 A * 5/1967 Jones, Jr. ............... D02J 13/003
                                                       219/201
4,326,121 A * 4/1982 Welsby .................... H05B 3/82
                                                       219/523
(Continued)

FOREIGN PATENT DOCUMENTS

BE  WO 2008023021 A1 * 2/2008 ........... F01N 3/2066
DE  10 2007 061 808 A1   6/2009
(Continued)

OTHER PUBLICATIONS

Japanese Office Action, Application No. 2014-517769, Mar. 15, 2016, 9 pages.

*Primary Examiner* — David Angwin
*Assistant Examiner* — Biniam Asmelash
(74) *Attorney, Agent, or Firm* — Foley & Lardner LLP

(57) ABSTRACT

The invention describes a tank comprising a solution, dispersion or emulsion for selective catalytic reduction in combustion engines. The tank comprises an electrical resistive heating element immersed in the tank. The electrical resistive heating element comprises at least one heating cord. The heating cord comprises metal filaments. The metal filaments •comprise a copper layer or a layer in a copper alloy, and comprise a surrounding layer in stainless steel, •or comprise a steel layer, surrounded by a layer in copper or in a copper alloy, surrounded by a nickel, zinc or tin layer or a layer of alloys comprising such metals; •or comprise a layer of low carbon or high carbon steel, and comprise a surrounding nickel, zinc or tin layer or layer of alloys comprising such metals, and the heating cord comprises a polymer coating layer.

16 Claims, 1 Drawing Sheet

(51) Int. Cl.
  *F01N 3/20* (2006.01)
  *H05B 3/12* (2006.01)
  *H05B 3/56* (2006.01)
  *B01D 53/00* (2006.01)
  *F24H 1/20* (2006.01)
  *F23J 15/04* (2006.01)

(52) U.S. Cl.
  CPC ........... *F24H 1/202* (2013.01); *F24H 9/1818* (2013.01); *H05B 3/12* (2013.01); *H05B 3/56* (2013.01); *H05B 3/82* (2013.01); F01N 2610/02 (2013.01); F01N 2610/10 (2013.01); F01N 2610/1406 (2013.01); F23J 2215/10 (2013.01); F23J 2219/20 (2013.01); F24H 2250/02 (2013.01); H05B 2214/02 (2013.01); Y02T 10/24 (2013.01)

(58) Field of Classification Search
  CPC ... H05B 3/12; H05B 3/56; H05B 3/82; H05B 2214/02; Y02T 10/24; F01N 3/2066; F01N 2610/10; F01N 2610/1406
  USPC ....... 219/545, 202, 549, 529, 528, 544, 548, 219/543, 319, 523
  See application file for complete search history.

(56) References Cited

U.S. PATENT DOCUMENTS

| | | | | |
|---|---|---|---|---|
| 4,983,814 | A * | 1/1991 | Ohgushi | D02G 3/441 219/212 |
| 5,930,459 | A * | 7/1999 | Eckman | H05B 3/04 219/523 |
| 6,229,123 | B1 * | 5/2001 | Kochman | A41D 13/0051 219/529 |
| 7,323,666 | B2 * | 1/2008 | Spohn | B32B 27/20 219/620 |
| 7,912,360 | B2 * | 3/2011 | Gschwind | B60K 15/00 392/302 |
| 8,850,797 | B2 | 10/2014 | Dougnier et al. | |
| 8,965,187 | B2 * | 2/2015 | Borgmeier | F16L 53/008 219/484 |
| 2002/0088220 | A1 * | 7/2002 | Weigl | B01D 53/9431 60/286 |
| 2007/0283681 | A1 * | 12/2007 | Makkee | B01D 53/90 60/274 |
| 2008/0047955 | A1 * | 2/2008 | Rock | A41D 31/0038 219/545 |
| 2008/0149620 | A1 * | 6/2008 | Li | H05B 3/146 219/545 |
| 2009/0183778 | A1 * | 7/2009 | Wildegger | B60S 1/487 137/13 |
| 2014/0345258 | A1 | 11/2014 | Dougnier et al. | |

FOREIGN PATENT DOCUMENTS

| | | |
|---|---|---|
| EP | 1 582 732 B1 | 10/2005 |
| EP | 2 339 138 A1 | 6/2011 |
| JP | 59-32784 A | 2/1984 |
| JP | 2-220389 A | 9/1990 |
| JP | 8-96936 A | 4/1996 |
| JP | 8-96942 A | 4/1996 |
| JP | 2009-540184 A | 11/2009 |
| WO | WO 2008/023021 A1 | 2/2008 |
| WO | WO 2011/076927 A1 | 6/2011 |

\* cited by examiner

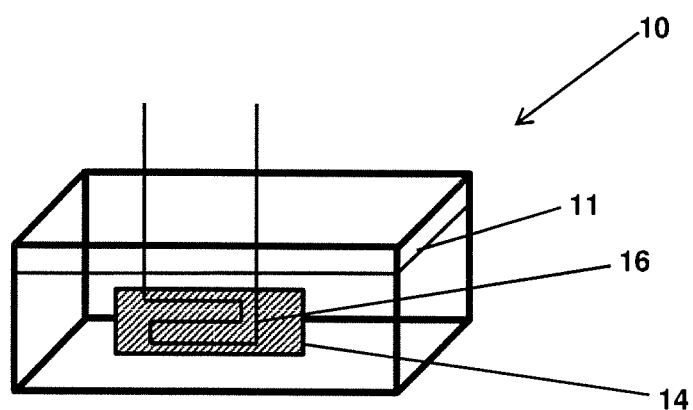

SELECTIVE CATALYTIC REDUCTION TANK WITH HEATING ELEMENT

TECHNICAL FIELD

The invention relates to a tank for use in selective catalytic reduction (SCR) systems and to an electrical resistance heating system for such tank. Such tanks are e.g. used in trucks and cars and comprise a reductor or a precursor for a selective catalytic reduction product. The electrical heating system of the invention comprises one or more heating cords that are immersed in the liquid in the tank.

BACKGROUND ART

A number of countries has legislation containing maximum limits for the emission of nitrogen oxides (NOX) in exhaust gases of vehicles driven by combustion engines. A method to reduce the amount of NOX in the exhaust is the use of selective catalytic reduction (SCR). In SCR systems, NOX in the exhaust gas are converted via a reductive chemical reaction into nitrogen and water. The conversion involves a catalytic reaction using a reductor. Ammonia is frequently used as reductor. The ammonia is obtained by disintegration of a precursor solution containing ammonia or urea. The precursor liquid is injected in the exhaust gas flow. To this end a car has one or more tanks containing the precursor liquid. An example of such precursor liquid is AdBlue (trademark of VDA, Verband der Automobilindustrie), commercial name of a water based solution containing 32.5% urea. Other examples are urea/ammonia formate solutions (e.g. sold under the commercial name Denoxium). Such precursor solutions are very corrosive.

Most water based precursor solutions can freeze at temperatures that occur in nature (e.g. a water based solution of 32.5% urea freezes at minus 11° C.). Therefore a system, e.g. a heating element, is required to thaw the precursor tank when the precursor liquid in the tank is frozen. The heating element can also be used to heat the precursor liquid to a suitable operational temperature.

Heating systems to be immersed in SCR tanks have to answer a number of requirements. A first requirement is that the heating systems must be able to generate a sufficient amount of heat to be able to thaw and/or heat in a sufficiently short time period the required amount of liquid. The required amount of heat depends on the volume of the tank, and in particular on the maximum amount of precursor liquid the tank can contain. The dimensions of the heating element have to be limited to leave sufficient space in the tank for the tank to contain a sufficient volume of precursor liquid without the tank and the accessories in and around the tank becoming to voluminous. It is requested that heating is performed first around the pump that is pumping the precursor liquid out of the tank, but other sections of the tank also have to be thawed and heated. Preferably, the heating system can heat different sections of the tank (e.g. remote sections in the tank or sections that are physically separated from other sections of the tank). Thawing should not only be performed around the pump, but also in other sections, such that precursor liquid is available at and towards the pump. The tank can have a complex design, with different accessories provided in the tank (pumps, sensors . . . ). Heating systems immersed in the tank are very efficient in terms of transfer of energy (heat) to the (frozen) precursor liquid. However, the immersed heating system should also be resistant to the conditions in the tank: the corrosive precursor (or volatile components, such as ammonia) and temperatures that in use can go up to over 100° C. Required is a long life time of the heating element, without change over time of its characteristics (including generation of heat). Electrical (resistive) heating systems have to be energy efficient, and have to be able to operate without demanding (too) large amounts of energy from the battery of the vehicle, which is especially of importance when starting the vehicle in cold weather conditions. Manufactures of SCR systems prefer heating systems that are easy to install.

A number of different systems have been developed to thaw and heat the tank. Some systems comprise separate resistive heating elements or a bypass of hot liquid or of hot gas around or through the tank. In general the heating systems are complex and expensive. Use of electrical resistive heating elements in the tank is known. EP 1582732 discloses such a system. Another example is provided in WO2008/023021, where a urea tank and a supply hose are described wherein a heating wire is partly provided in the supply hose. The heating wire is in the shape of a spiral or loop that is at least partly present in the tank or in the supply hose.

EP 2339138A1 describes a flange for holding a quantity of fluid within a tank. The flange is equipped with a heating element comprising at least one resistive wire for conducting an electrical current and dissipating heat as an effect of the electrical current. The at least one resistive wire is guided at a plurality of separate locations along its length by guiding means to form a heating surface, wherein a first part of the heating surface is present inside the flange and a second part of the heating surface is present outside the flange.

It is a disadvantage of systems using a heating wire, that the heating wire needs to have at least a diameter of several millimeter. Such thickness makes it difficult (or even impossible) to bend the heating wire to position it in the tank such that the full tank can be heated. Furthermore, such heating wire cannot be positioned at or near accessories of the tank or in remote sections of the tank due to the high resistance of the heating wire to bending.

It is a specific problem of existing heating system that it is difficult or even impossible to position the heating system in (remote) corners of the tank. Such existing systems are complex, and their assembly and installation is time consuming, difficult and expensive.

If the tank gets too hot, it can get overheated. It is desired that the heating systems contain safety mechanisms in order to prevent overheating.

A specific problem relates to the life time, as the conditions of the heating tank are very corrosive.

DESCRIPTION OF THE DRAWINGS

FIG. 1 is a diagram illustrating an exemplary selective catalytic reduction tank with a heating element.

DISCLOSURE OF THE INVENTION

It is the objective of the invention to provide a selective catalytic reduction (SCR) tank with an improved resistance heating element that is immersed in the SCR liquid in the tank. It is a specific objective to provide an SCR tank with an electrical resistive heating element that is suitable in dimension, shape and power for specific designs of SCR tanks, or for SCR tanks and their accessories (e.g. a pump and sensors in the tank). It is a further objective to develop an electrical resistive heating elements with efficient use of the applied power and that is resisting the operational conditions of the SCR system. It is a further objective to develop an electrical resistive heating element that can be easily installed in the SCR module, including in remote sections of SCR tanks with complex shape (this means including volume heating). It is another specific objective to provide the resistance heating element in a simple way with features that prevent overheating of the heating element.

Another important objective is to provide a heating cord that is sufficiently resisting cyclic loading, as it is possible that frozen blocks of precursor liquid are clinging to the heating cord when starting the engine of the vehicle, or are floating in the precursor liquid and hit the heating cord, resulting in a dynamic mechanical load onto the heating cord.

It is a specific objective to develop a system that is sufficiently durable, especially relating to corrosion of the heating element.

The objectives are reached by providing a tank comprising a solution (e.g. in water), dispersion (e.g. in water) or emulsion (e.g. in water) for selective catalytic reduction in combustion engines. The tank comprises an electrical resistive heating element immersed in the tank. The electrical resistive heating element comprises at least one heating cord (resistance heating cord). The heating cord comprises metal filaments. The metal filaments

- comprise a copper layer or a layer in a copper alloy and have a surrounding stainless steel layer;
- or the metal filaments comprise a steel layer, surrounded by a copper layer or a layer of a copper alloy, which is surrounded by a nickel, zinc or tin layer or by a layer of alloy of such metals,
- or the metal filaments comprise a layer in low carbon steel of in high carbon steel, surrounded by a nickel, zinc or tin layer or by a layer of alloy of such metals, and the heating cord comprises a polymer coating layer.

FIG. 1 shows a tank 10 including a solution, dispersion or emulsion 11 for selective catalytic reduction in combustion engines. The tank 10 includes an electrical resistive heating element 14 immersed in the tank. The electrical resistive heating element 14 may include a heating cord 16. The heating cord 16 may include metal filaments. In some embodiments, the metal filaments may include a copper layer or a layer in a copper alloy, and include a surrounding layer in stainless steel. In some embodiments, the metal filaments may include a steel layer, surrounded by a layer in copper or in a copper alloy, surrounded by a nickel, zinc or tin layer or a layer of alloys comprising such metals. In some embodiments, the heating cord 16 may include a polymer coating layer.

The metal filaments can be twisted or cabled together in one or more steps of the production process of the heating cord. The use of a cord ensures that a resistive heating element will be obtained that can be bent easily.

The heating cord combines a corrosion resisting surrounding layer of the filament (stainless steel, or nickel, zinc or tin or alloys of such metals) with a polymer coating layer of the heating cord. This combination has shown to be required as the polymer coating layer on its own was not sufficient to obtain the required corrosion resistance, due to unavoidable diffusion of corrosive gases (e.g. ammonia) through the polymer coating layer. Hence a corrosion resistant surrounding metal layer of the filament is required. A corrosion resistant surrounding metal layer of the filament is neither sufficient to obtain the required corrosion resistance, due to the occurrence of electrochemical corrosion.

Preferably the polymer coating layer is a fluor containing polymer coating layer. Alternatively silicone coatings can be applied. Preferably the polymer coating layer has a thickness between 0.15 and 0.6 mm.

The tank can be made out of any suitable material, preferably out of a material with a high chemical resistance against the precursor liquid that contains for instance urea. Metals and plastics, e.g. polyolefins (and especially high density polyethylene) and polyamides, are highly suitable. The tank can be made using any method that is suited for the production of hollow objects. To produce a plastic tank, technologies such as blow molding and injection molding are particularly suited.

The tank can e.g. have a maximum volume between 1 and 25 liter; for instance between 3 and 22 liter; for instance between 4 and 15 liter. The invention is especially beneficial for tanks in the higher range of the volume range (e.g. tanks of more than 10 liter). The larger the volume of the tank, the more difficult to thaw and heat the volume of liquid in the tank. The invention offers a very effective and efficient heating system in particular for these larger tanks, as the heating cord can be given easily a three dimension path in the tank and can be installed more easily.

Preferably the total required power that can be supplied by the heating cord is between 90 and 400 W per element, more preferably, between 100 and 220 W per element. The supply voltage can e.g. be between 8 V and 15 V.

The tank can e.g. contain a water based solution of 32.5% urea. An example of such a water based solution is known under the commercial name AdBlue. Other example are water based urea/ammonia formate solutions (as e.g. sold under the trademark Denoxium). Urea/ammonia formate solutions have the benefit to freeze at lower temperatures than 32.5% urea solutions, but have the drawback that formic acid can be formed, resulting in very corrosive conditions.

When using metal filaments that comprise the combination of a copper layer (or a layer of a copper alloy) and a stainless steel layer, an important benefit exists in terms of electrical resistance especially beneficial for use in an SCR tank. Using such filaments heating cords can be produced that have a suitable length and electrical resistance (and hence electrical resistance heating power—for application in an SCR tank. This allows optimal heating of the volume of the SCR tank. A metal filament with a same diameter and only copper (or copper alloy) would result in a heating cord of excessive length for a same resistance, it would be difficult to insert such length in the heating tank, as it would lead to problems in sections of high power density. Only copper would lead to small diameters and insufficient fatigue resistance. Unavoidable diffusion of ammonia through the polymer layer (even through a well selected coating a certain degree of diffusion will occur) would affect the copper very fast.

A stainless steel filament would result in a heating cord with a too short length for a same electrical resistance. A too short length would lead to an inhomogeneous heat distribution in the volume of the tank. Using a resistance heating cord that comprises metal filaments that comprise a combination of a copper layer (or a layer of a copper alloy) and a steel layer, the electrical conductivity is determined mostly by the copper layer (or by the copper alloy layer).

Using a metal filament comprising a layer in copper or a layer of a copper alloy and a surrounding stainless steel layer, the layer in copper or of a copper alloy preferably has a volume percentage between 20 and 80% of the metal filament, more preferably between 30 and 50%.

When using a metal filament comprising a steel layer surrounded by a layer of copper or of a copper alloy, and surrounded by a layer in nickel, zinc or tin or of an alloy of such metal, preferably CCS40 or CCS30 are used surrounded by a layer in nickel, zinc or tin or of an alloy of such metal. CCS40 (Copper Cladded Steel 40) is a steel filament surrounded by a copper layer, such that the filament has an electrical conductivity equal to 40% of the electrical conductivity of a copper filament of the same diameter. CCS30 (Copper Cladded Steel 30) is a steel filament surrounded by a copper layer, such that the filament has the electrical conductivity equal to 30% of the electrical conductivity of a copper filament of the same diameter. CCS40 and CCS30 are best suited for the invention (better than e.g. CCS20, CCS50 or CCS60) given the durability and conductivity and balance of the thickness of the steel layer and of the diameter of the filaments, especially in respect of the power provided per unit of area of the surface of the heating cord.

A low carbon steel is a steel grade having for all elements of the alloy a weight percentage below 0.5% (obviously with the exception of iron and possibly with the exception of silicon and manganese), for instance below 0.2% by weight; and a percent by weight of carbon below 0.3%. The invention advantageously uses a low carbon steel grade with a carbon percentage by weight below 0.2%, even more preferred is a carbon weight percentage below 0.06%.

A high carbon steel is a steel grade with a carbon weight percentage between 0.3 and 1.7. The invention advantageously uses high carbon steel with a carbon weight percentage between 0.4 and 0.95%, even more preferred is a carbon weight percentage between 0.55 and 0.85%. High carbon steel may contain alloy elements.

When the metal filaments have a surrounding layer in nickel, tin or zinc or of an alloy of such metals, this surrounding layer is preferably between 0.5 and 10 weight percent of the metal filament, more preferably between 2 and 6 percent by weight, even more preferred between 3 and 5 percent by weight.

When using a surrounding layer in zinc, this surrounding layer is preferably between 0.5 and 5 percent by weight of the metal filament, more preferably between 0.5 and 2.5 percent by weight. When using a surrounding layer in nickel, this surrounding layer is preferably between 0.5 and 5 percent by weight of the metal filament, more preferably between 0.5 and 2.5 percent by weight.

According to the invention the tank comprises an electrical resistance heating cord that resists the corrosive conditions in the SCR tank. The corrosive conditions are complex. On the one hand the precursor liquid is corrosive, e.g. as ammonia is set free. On the other hand the conditions are such that electrochemical corrosion could occur.

The heating cord comprises a polymer coating layer. A function of the polymer coating layer is to provide resistance to the heating cord against electrochemical corrosion. The coating layers also prevent short circuits when the heating cord touches the heating cord along its length or when two heating cords in the tank would make contact along their length. In a specific embodiment of the invention, the heating cord is provided with a polymer coating layer that is comprising fluorine. Fluorine containing coatings on the heating cord have the required chemical (corrosion) resistance and temperature resistance for use in SCR tanks where temperature can mount up to for instance 150° C.

Examples of fluorine containing coatings that can be used in the invention are PFA (perfluoroalcoxy), ETFE (ethylene tetrafluorethylene copolymer), MFA and PPS (polyphenylenesulfide). When using PFA, preferably a grade of PFA is used that has temperature resistance in use up to 250°.

Preferably the thickness of the polymer coating layer is between 0.15-0.6 mm. An important function of the coating layer of the heating cord (next to providing resistance against electrochemical corrosion, high temperature resistance and the improvement of the durability) is the determination of the thickness of the heating cord to limit the generation of heat per unit of surface area of the heating cord, for instance 0.3-0.9 W/cm$^2$, more preferred between 0.35-0.6 W/cm$^2$. This limitation in generation of heat is required to prevent that the precursor liquid gets locally too hot which would lead to the generation of gaseous products (e.g. excessive generation of gaseous ammonia). As a result, the pressure in the tank would increase and the life time of the heating cord would decrease due to increased diffusion through the coating. The thicker the coating layer, the lower the heat generation per unit of area of the surface of the heating cord will be.

It is also possible to apply a coating on the individual metal filaments. Such coating can be a polyurethane coating. It is a benefit of such coating that if a metal filament would break, spots over the length of the heating cord with a locally higher electrical resistance are prevented and hence also local overheating (or local hot spots).

Preferably the total length of the heating cord in the tank is between 0.8 and 20 meter, more preferably between 3 and 12 meter, even more preferred between 5 and 7.5 meter. For instance two circuits of each 7.2 meter length can be provided in the tank. A first circuit can be provided immediately below the pump (the pump is e.g. centrally positioned in the tank) and a second circuit in the remainder of the volume of the tank.

Heating cords used in the SCR tank according to the invention are sufficiently resisting fatigue. A considerable mechanic load (that could lead to fatigue failure of the heating cord) is applied to the heating cord when the vehicle moves when ice blocks are still clinging onto the heating cord or are floating in the SCR tank. The selection of material and the selection of the diameter of the metal filaments and the presence of the polymer coating on the heating cord contribute to the resistance to fatigue of the heating cord. The combination of sufficiently fine filaments contributes to an increase of the fatigue resistance. A too large filament diameter drastically reduces the fatigue resistance of the heating cord.

A preferred diameter range of the metal filaments is 50-250 micrometer, more preferred is 55-150 micrometer. Filaments of such fine diameter are better resisting cyclic bending loads.

Preferably, the equivalent diameter of the heating cord before adding the polymer coating layer is between 0.2-1.2 mm, for instance 0.65 mm. With equivalent diameter is meant the diameter of a perfectly round cord with the same cross sectional area as the cross section of the cord that is considered (and which is not necessarily of perfect round shape). The diameter of the heating cord with the polymer coating preferably is 0.5-2 mm, for instance 1.45 mm.

Preferably the heating cord has an electrical resistance between 0.05 and 2.5 Ohm/meter (at 20° C.); more preferably between 0.1 and 2 Ohm/meter (at 20° C.); even more preferred between 0.1 and 0.5 Ohm/meter (at 20° C.).

The metal filaments used according to the invention create a PTC-effect (Positive Temperature Coefficient) in the heating cord. It results in an important benefit in SCR systems as a positive PTC-effect means that the electrical resistance of the heating wire is increasing with increasing temperature in the tank. When the temperature increases in the tank, less heat will be generated by the heating cord, which is a desired effect. On the one hand more heat generation is required at low temperatures in the tank (especially when the liquid in the tank is in frozen condition). At higher temperatures a risk exists of overheating of the tank, therefore a heating cord with a positive temperature coefficient is desired as safety feature to prevent overheating of the tank.

The PTC-effect can be expressed using the formula $R(T)=R0*(1+\text{alpha}*(T-T0))$, wherein $R(T)$ expresses the electrical resistance of the heating cord in Ohm/m as a function of the temperature T (in ° C.). R0 (in Ohm/m) is the electrical resistance (in Ohm/m) of the heating cord at reference temperature T0 (in ° C.). T0 is mostly taken at 0° C. An important positive value of the coefficient alpha (/° C.) indicates the presence of an important PTC effect. This is the case for heating cords used in the tank of the invention where alpha is about 0.004/° C. Metal filaments made out of stainless steel are having the PTC-effect to a much lesser extent or not at all compared to the heating cords of the invention, as the coefficient alpha for heating cords made out of stainless steel are an order of magnitude 10 lower than the heating cords used in the invention.

Preferably the resistance heating cord has a bending radius smaller than 1.5 times the diameter of the heating cord. With bending radius is meant that the heating cord can be bent to such a radius, it does not necessarily mean that it is effectively bent to such a radius in the tank. The bending radius is determined by making by hand a bend as short as possible. The radius of this bend (which is the bending radius) can be measured in a number of ways. One way is the use of thickness gauges, looking for the thickest gauge that can be put in the bent of the cord.

It is a benefit when the heating cord is flexible, when it can be bent easily. It allows easy installation of the heating cord in the SCR tank, even in narrow places or in remote, difficult to access sections of the tank. Use of a flexible (easy to bend) heating cord allows that the heating cord can be given a complex path or a high density (e.g. under the pump module where high power of heat generation is required) in the tank, in order to heat the different sections in the tank in an efficient way.

In a specific embodiment of het invention a plurality of (equal or different) heating cords—with different (or with equal) electrical resistance (in Ohm/meter)—are connected to each other, wherein each heating cord is heating in a suitable way a specific section of the SCR tank. Heating cords with different electrical resistance (in Ohm/meter) can be used for different sections, depending on the local requirement of heat generation in the tank.

Preferably the resistance heating cord is fixed at at least one position along its length internally to the wall or to a part of the tank. The fixation can for instance be done at anchoring points at the inner wall of the tank, or via baffles provided to this end in the tank. The fixation can be done via clamping or via threading the heating cord through a groove or through an opening. Such fixation of the resistance heating cord to the internal wall of the tank or to a part of the wall prevent unwanted displacement or movement of the heating cord in the tank. The heating cord stays in place, and consequently heat is generated where it should be generated according to the design of the system.

One or more heating cords according to the invention can be present in the tank, in serial or in parallel arrangement, or in a combination of serial and parallel arrangements. If more than one heating cord is used, the heating cords can be the same or different. Such configurations allow to specify the generation of heat in the different sections of the tank when designing the systems.

The heating element can comprise a fabric onto which the heating cord is fixed. Preferably the textile fabric is an open fabric. With open fabric is meant a textile fabric that has a cover fabric substantially lower than 1. The cover factor is the fraction of surface covered by the yarns of the fabric compared to the area covered by the textile fabric. At a fabric with cover factor equal to 1, the total surface is covered by yarns and there is no open space between the yarns that build the fabric; at a cover factor equal to 0.5, half of the surface is covered by yarns and half of the surface is not covered as space is present between the yarns that build the fabric. Preferably in the invention a textile fabric is used with cover factor below 0.7, more preferably with cover factor below 0.6.

It is a specific benefit of the use of an open textile fabric (and particularly with cover factor below 0.7 and more particularly with cover factor below 0.6) that the heating element allows sufficient fluid flow in the tank, through the textile fabric. Such fluid flow can occur when differences in temperature in the tank are present. The fluid flow supports the equalizing of the temperature of the fluid in the SCR tank.

The textile fabric onto which the heating cord is fixed can e.g. be a woven fabric or a warp knitted fabric.

The fixation of the resistance heating cord (or resistance heating cords) onto the textile fabric can e.g. be done via stitching by means of a stitching yarn, or by means of welding (e.g. ultrasonic welding to a textile fabric that is comprising thermoplastic polymers). The fixation is done via a predetermined pattern. The pattern is selected among other reasons by the shape of the tank. After fixing the resistance heating cord (or resistance heating cords), the shape is cut or punched out of the textile fabric.

It is a benefit of electrical resistance heating elements comprising a textile fabric onto which a heating cord is stitched, that the textile fabric can be given a three-dimensional shape, via bending in more than one plane. This can e.g. be done by cutting and folding legs of the fabric, each leg comprising part of a heating cord and/or by draping the fabric in a curved way in the tank, thereby departing from the flat 2D-fabric. It is also possible that parts of the fabric are given a three-dimensional shape via bending in more than one plane. Hence, the fabric or parts of the fabric—with the heating cord fixed to it—can be given a double bent shape in the tank. This way, heating can be more directed to specific locations in the tank.

According to a second aspect of the invention, the use is described of at least one heating cord in an electrical resistive heating element for the heating or thawing of a solution, dispersion or emulsion for use in selective catalytic reduction in combustion engines, wherein the at least one heating cord is immersed in the solution, dispersion or emulsion that the heating cord has to heat or to thaw; and wherein the heating cord comprises metal filaments;

the metal filaments comprise a copper layer or a layer in a copper alloy and have a surrounding stainless steel layer;
  or the metal filaments comprise a steel layer, surrounded by a copper layer or a layer of a copper alloy, which is surrounded by a nickel, zinc or tin layer or by a layer of alloy of such metals, or the metal filaments comprise a layer in low carbon steel of in high carbon steel, surrounded by a nickel, zinc or tin layer or by a layer of alloy of such metals, and the heating cord comprises a polymer coating layer.

MODES FOR CARRYING OUT THE INVENTION

A first example is a heating cord made out of metal filaments that have a copper core and a sheath out of stainless steel. The volume percentage of copper in the metal filaments is 34%. The metal filaments are single end drawn to a diameter of 0.058 mm; the filaments are having an electrical resistance of 18.3 Ohm/meter length (at 20° C.). Seven of these filaments are twisted together forming a strand. Twelve of these strands are twisted together to form a heating cord. The heating cord has an electrical resistance of 0.22 Ohm/meter length (at 20° C.). The heating cord is provided with a PFA (perfluoroalcoxy)-coating to counter as much as possible the effects of corrosion in the SCR tank. For instance two circuits each of a length of 7 meter heating cord are installed in parallel in the SCR tank. A first circuit is located near the pump (the pump can for instance be located centrally in the tank) and a second circuit is provided in the remainder of the tank volume. The electrical resistance of each of the heating cords in the tank is 1.5 Ohm (at 20° C.), with a supply voltage of 13.5 V. The supply voltage can vary depending on the car manufacturer and the car model.

In a second example a heating cord is made consisting out of metal filaments with a copper core and a sheath of stainless steel. Each filament has a volume percentage of copper of 34% (in the core) and a sheath out of stainless steel. The metal filaments are drawn to a diameter of 0.212 mm. As such, the drawn metal filaments are having an electrical resistance of 1.4 Ohm/meter (at a temperature of 20° C.). Six of such filaments are twisted around a seventh, centrally positioned same filament. This way, a heating cord is made that is having an electrical resistance of 0.20 Ohm/meter (at 20° C.). The heating cord is coated with a PFA (perfluoroalcoxy) coating to prevent as much as possible negative effects of the corrosive conditions in the SCR tank. For instance, a heating cord with 7 meter length is introduced in the SCR tank, resulting in a total electrical resistance of the length of heating cord in the tank of 1.4 Ohm is (at a temperature of 20° C.).

In another example a heating cord is used in the tank, the heating cord is consisting out of metal filaments with a core in steel, surrounded by a layer in copper or of a copper alloy and again surrounded by a layer in nickel, zinc or tin. CCS30 can for instance be used, with a surrounding nickel layer (e.g. 4 percent by weight of nickel with respect to the total weight of the metal filament). Nineteen filaments with a diameter of 0.135 mm each are twisted together to form a cord with an equivalent diameter of 0.76 mm. A 0.35 mm thick PFA coating is applied to the cord. A length of 7.2 meter of the heating cord is installed in the SCR tank. The heating cord has an electrical resistance of 0.219 Ohm/meter length (at a temperature of 20° C.).

The electrical resistance heating element can comprise a woven fabric made e.g. out of polyamide 6.6 monofilament. The polyamide 6.6 monofilament can have a diameter of 350 μm and a circular cross section. The fabric can be woven in a 2/1 twill weave. The gauze openings of the fabric are 590 μm. The fabric has a cover factor of 0.605. The fabric has a mass of 300 g/m² and the thickness of het fabric is 750 μm. After weaving, the fabric has been thermally stabilized.

Onto the fabric a heating cord is stitched, e.g. using a PTFE (polytetrafluorethylene) stitching yarns. The positioning of the one or more heating cords on the fabric surface are among others determined by the requirement for heat generation in the different sections of the tank and by the shape of the tank. After stitching the heating cord onto the fabric, the fabric is cut or punched to size and shape. The shape is determined by the design of the tank and by where heating is required in the tank.

In an example stitched on the fabric is a heating cord made out of metal filaments that have a copper core and a sheath out of stainless steel. The volume percentage of copper in the metal filaments is 34%. The metal filaments are single end drawn to a diameter of 0.058 mm; the filaments are having an electrical resistance of 18.3 Ohm/meter length (at 20° C.). Seven of these filaments are twisted together forming a strand. Twelve of these strands are twisted together to form a heating cord. The heating cord has an electrical resistance of 0.22 Ohm/meter length (at 20° C.). The heating cord is provided with a PFA (perfluoroalcoxy)-coating to counter as much as possible the effects of corrosion in the SCR tank. The heating cord is coated with PFA (perfluoroalcoxy)-coating (with thickness 0.40 mm). The heating cord has—after coating—a diameter of 1.45 mm. For instance two circuits each of a length of 7 meter heating cord are stitched onto the fabric by means of a PTFE (polytetrafluorethylene) stitching yarn.

The invention claimed is:

1. A tank assembly comprising:
   a selective catalytic reduction tank;
   a solution, dispersion or emulsion provided in the selective catalytic reduction tank, the solution, dispersion or emulsion comprising a precursor configured for selective catalytic reduction in combustion engines; and
   an electrical resistive heating element in the selective catalytic reduction tank and immersed in the solution, dispersion or emulsion, the electrical resistive heating element configured to carry an electrical current,
   wherein the electrical resistive heating element comprises at least one heating cord and the at least one heating cord comprises a plurality of metal filaments,
   wherein the plurality of metal filaments comprise a copper layer or a layer in a copper alloy and have a surrounding stainless steel layer; or the plurality of metal filaments comprise a steel layer, surrounded by a copper layer or a layer of a copper alloy, which is surrounded by a nickel, zinc or tin layer or by a layer of alloy of such metal, and
   wherein the at least one heating cord comprises a polymer coating layer.

2. A tank assembly as in claim 1, wherein the polymer coating layer comprises fluorine.

3. A tank assembly as in claim 1, wherein the polymer coating layer comprises a perfluoroalcoxy coating layer.

4. A tank assembly as in claim 1, wherein the thickness of the polymer coating layer is between 0.15 mm and 0.6 mm.

5. A tank assembly as in claim 1, wherein the at least one heating cord has at 20° C. an electrical resistance between 0.05 Ohm per meter length and 2.5 Ohm per meter length.

6. A tank assembly as in claim 1, wherein the at least one heating cord has a bending radius smaller than 1.5 times the diameter of the heating cord.

7. A tank assembly as in claim 1, wherein the at least one heating cord is fixed internally to the wall or part of the tank at least at one position along its length.

8. A tank assembly as in claim 1, wherein the tank comprises more than one heating cord arranged in a series electrical circuit.

9. A tank assembly as in claim 1, wherein the tank comprises more than one heating cord arranged in a parallel electrical circuit.

10. A tank assembly as in claim 1, wherein the tank comprises more than one heating cord arranged in a combination of parallel and series electrical circuits.

11. A tank assembly as in claim 1, wherein the at least one heating cord is fixed onto a textile fabric.

12. A tank assembly as in claim 11, wherein said textile fabric is an open fabric.

13. A tank assembly as in claim 11, wherein said textile fabric is a woven fabric or a warp knitted fabric.

14. A tank assembly as in claim 11, wherein the at least one heating cord is stitched onto said textile fabric.

15. A tank assembly as in claim 1, wherein the plurality of metal filaments are twisted together in the at least one heating cord.

16. A tank assembly as in claim 1, wherein the at least one heating cord combines a corrosion resisting surrounding layer of the plurality of metal filaments with the polymer coating layer.

* * * * *